US010794709B2

(12) United States Patent
Seo

(10) Patent No.: US 10,794,709 B2
(45) Date of Patent: Oct. 6, 2020

(54) APPARATUS OF COMPENSATING FOR A SENSING VALUE OF A GYROSCOPE SENSOR, A SYSTEM HAVING THE SAME, AND A METHOD THEREOF

(71) Applicants: HYUNDAI MOTOR COMPANY, Seoul (KR); KIA MOTORS CORPORATION, Seoul (KR)

(72) Inventor: Min Wook Seo, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 87 days.

(21) Appl. No.: 15/821,214

(22) Filed: Nov. 22, 2017

(65) Prior Publication Data

US 2019/0120631 A1  Apr. 25, 2019

(30) Foreign Application Priority Data

Oct. 23, 2017  (KR) .......................... 10-2017-0137709

(51) Int. Cl.
*G01C 21/30* (2006.01)
*G01C 19/56* (2012.01)
*G01C 25/00* (2006.01)
*G01C 21/36* (2006.01)
*G01C 21/20* (2006.01)
*G01C 21/18* (2006.01)

(52) U.S. Cl.
CPC ............. *G01C 21/30* (2013.01); *G01C 19/56* (2013.01); *G01C 21/18* (2013.01); *G01C 21/20* (2013.01); *G01C 21/367* (2013.01); *G01C 21/3647* (2013.01); *G01C 25/005* (2013.01)

(58) Field of Classification Search
CPC ..................................................... G01C 21/30
See application file for complete search history.

(56) References Cited

U.S. PATENT DOCUMENTS

| 5,440,484 A | * | 8/1995 | Kao | ........................ G01C 17/38 33/356 |
| 6,502,033 B1 | * | 12/2002 | Phuyal | ................... G01C 21/30 340/988 |

(Continued)

FOREIGN PATENT DOCUMENTS

| JP | 2012154669 | 8/2012 |
| JP | 2016014676 | 1/2016 |

(Continued)

*Primary Examiner* — Michael A Berns
(74) *Attorney, Agent, or Firm* — Lempia Summerfield Katz LLC

(57) ABSTRACT

An apparatus of compensating for a sensing value of a gyroscope sensor, a system having the same, and a method thereof are provided. The apparatus includes a gyro bias compensator that eliminates a gyro bias from the gyro sensing value, which is received from a gyroscope sensor, through map matching between a detailed map and vehicle surrounding data which is acquired, and a gyro scale factor compensator that calculates a gyro scale factor by calculating a heading angle variation of a road, on which a vehicle is traveling, by using the detailed map when the vehicle is turning, and compensates for the gyro sensing value by using the calculated gyro scale factor.

17 Claims, 11 Drawing Sheets

(56) References Cited

U.S. PATENT DOCUMENTS

| | | | |
|---|---|---|---|
| 6,643,587 B2* | 11/2003 | Brodie | G01C 21/165 |
| | | | 342/457 |
| 7,840,369 B2 | 11/2010 | Lee et al. | |
| 9,057,615 B2* | 6/2015 | Rao | G01C 21/16 |
| 9,719,786 B2* | 8/2017 | Rao | G01C 21/16 |
| 9,803,983 B2 | 10/2017 | Czompo et al. | |
| 9,816,818 B2 | 11/2017 | Czompo et al. | |
| 10,018,474 B2* | 7/2018 | Li | G01C 21/34 |
| 10,240,931 B2* | 3/2019 | Rao | G01C 21/16 |
| 2008/0022790 A1 | 1/2008 | Lee et al. | |
| 2012/0173140 A1 | 7/2012 | Czompo et al. | |
| 2012/0173142 A1 | 7/2012 | Czompo et al. | |
| 2012/0173190 A1 | 7/2012 | Czompo et al. | |
| 2012/0173195 A1 | 7/2012 | Opshaug et al. | |
| 2015/0247728 A1 | 9/2015 | Rao et al. | |
| 2016/0370177 A1 | 12/2016 | Laine et al. | |
| 2018/0095476 A1* | 4/2018 | Madsen | G05D 1/0278 |
| 2018/0340779 A1* | 11/2018 | Faulkner | G01C 21/16 |

FOREIGN PATENT DOCUMENTS

| | | |
|---|---|---|
| KR | 100772915 | 11/2007 |
| KR | 10-1160630 | 6/2012 |
| KR | 20140025244 | 3/2014 |
| KR | 20170032986 | 3/2017 |

* cited by examiner

APPARATUS OF COMPENSATING FOR A SENSING VALUE OF A GYROSCOPE SENSOR, A SYSTEM HAVING THE SAME, AND A METHOD THEREOF

CROSS-REFERENCE TO RELATED APPLICATION

This application is based on and claims the benefit of priority to Korean Patent Application No. 10-2017-0137709, filed on Oct. 23, 2017, in the Korean Intellectual Property Office, the disclosure of which is incorporated herein in its entirety by reference.

TECHNICAL FIELD

The present disclosure relates to an apparatus of compensating for a sensing value of a gyroscope sensor, a system having the same, and a method thereof, and more particularly, to a technology capable of compensating a gyroscope sensor through a sensor map mapping manner of a vehicle driving support.

BACKGROUND

In general, various moving bodies, (such as ships, airplanes, and automobiles), are equipped with a positioning system for recognizing a current position and a current movement speed to determine a moving path. The positioning system receives radio waves indicating latitude, longitude, altitude, or the like from a plurality of global positioning systems (hereinafter, referred to as "GPS"), computes the current position of the moving body, and marks the current position and the moving path by using map information.

A vehicle driving support device, which has been mainly used to support the driving of a driver, operates together with such a positioning system to detect the location of a vehicle, thereby providing various system control functions, such as lane departure warning, front and rear collision warning, and the like.

The vehicle driving support device employs Satellite Base Navigation and Dead Reckoning Navigation to determine the current position of the vehicle. The vehicle driving support device employs a GPS receiver for Satellite Base Navigation and employs a dead-reckoning sensor for Dead Reckoning Navigation.

The dead-reckoning sensor includes an odometer sensor to extract a traveling speed and a traveling distance and a gyroscope sensor to extract a heading angle. The gyroscope sensor is a device which measures an angular velocity. The location of the vehicle obtained by using the gyroscope sensor has errors increasing as operation time is prolonged, and the errors in measuring the location of the vehicle are accumulated over time in which the gyroscope sensor is used. The level of a gyro signal is changed as a function of time due to the errors when the vehicle is stopped, which is called "bias drift". Accordingly, it is necessary to correct the bias drift.

In particular, it is difficult for an autonomous driving or highway driving support system to recognize a lane through an image on a road having a curvature which is rapidly represented. Accordingly, the autonomous driving or highway driving support system mainly depends on Dead Reckoning Navigation among localization technologies. When the gyroscope sensor fails to produce an exact sensing result, a localization result is not exact, thereby causing a vehicle accident such as lane departure.

SUMMARY

The present disclosure has been made to solve the above-mentioned problems occurring in the prior art while advantages achieved by the prior art are maintained intact.

An aspect of the present disclosure provides an apparatus of compensating for a sensing value of a gyroscope sensor, a system having the same, and a method thereof, capable of improving localization performance by eliminating a bias, which serves as a drift error of the gyroscope sensor, using a detailed map and the lateral control of a vehicle, and by calculating a scale factor.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus of compensating for a gyro sensing value may include a gyro bias compensator that eliminates a gyro bias from the gyro sensing value, which is received from a gyroscope sensor, through map matching between a detailed map and vehicle surrounding data which is actually acquired, and a gyro scale factor compensator that calculates a gyro scale factor by calculating a heading angle variation of a road, on which a vehicle is traveling, by using the detailed map when the vehicle is turning, and compensates for the gyro sensing value by using the calculated gyro scale factor.

According to an embodiment, the gyro bias compensator may perform the map matching when the vehicle is traveling straight ahead.

According to an embodiment, the gyro bias compensator may include: a map matching entrance determiner that determines whether the vehicle is traveling straight ahead and allows the apparatus to enter into a map matching mode if the vehicle is traveling straight ahead; a map matcher that performs the map matching between the detailed map and captured image data of surroundings of the vehicle or LIDAR sensing data when the apparatus enters into the map matching mode; a map matching gyro bias calculator that calculates a map matching gyro bias based on a result of the map matching; and a gyro bias corrector that corrects for the gyro sensing value by eliminating the map matching gyro bias from the gyro sensing value.

According to an embodiment, the map matching entrance determiner may determine whether a forward runway is a straight road, an angle of a steering wheel is zero, and map matching accuracy is high, and may allow the apparatus to enter the map matching mode if the forward runway is the straight road, the angle of the steering wheel is zero, and the map matching accuracy is high.

According to an embodiment, the apparatus may further include a suspension gyro bias calculator that calculates a suspension gyro bias when the vehicle is stopped.

According to an embodiment, the gyro bias corrector may correct for the gyro sensing value by using the suspension gyro bias when the vehicle is stopped.

According to an embodiment, the map matching gyro bias calculator may calculate the map matching gyro bias by subtracting a heading angle error value, which is obtained through the map matching, from a heading angle acquired by the gyroscope sensor through dead reckoning navigation.

According to an embodiment, the map matching gyro bias calculator may calculate a final map matching gyro bias by dividing the calculated map matching gyro bias by the number of times of performing the dead reckoning navigation.

According to an embodiment, the gyro scale factor compensator may calculate the gyro scale factor when the vehicle is turning.

According to an embodiment, the gyro scale factor compensator may include: a gyro scale factor calculation mode entrance determiner that determines whether the vehicle is turning and allows the apparatus to enter into a scale factor calculation mode if the vehicle is turning; a gyro scale factor calculator that calculates the gyro scale factor by using the heading angle variation of the road, on which the vehicle is traveling, on the detailed map, and an accumulation value of heading angle variations, which are sensed by the gyroscope sensor, when the apparatus enters into the gyro scale factor calculation mode; and a gyro scale corrector that corrects for the gyro sensing value by using the calculated gyro scale factor.

According to an embodiment, the gyro scale factor calculation mode entrance determiner may determine: whether a difference in heading angle between starting and ending points of a forward curved road is below a first reference value; whether a difference between a variation in a steering wheel angle and a rotation angle value of the gyro sensing value is below a second reference value; whether a radius of the forward curved road is below a third reference value; and whether a lateral acceleration of the vehicle is below a fourth reference value. The gyro scale factor calculation mode entrance determiner may allow the apparatus to enter into the scale factor calculation mod if the difference in the heading angle between the starting and ending points of the forward curved road is below the first reference value, if the difference between the variation in the steering wheel angle and the rotation angle value of the gyro sensing value is below the second reference value, if the radius of the forward curved road is below the third reference value, and if the lateral acceleration of the vehicle is below the fourth reference value.

According to an embodiment, the gyro scale factor calculator may calculate the gyro scale factor by dividing a result value, which is obtained by subtracting a heading angle in turning from a heading angle at a turning ending point of the road, on which the vehicle is traveling, on the detailed map, by an accumulation value of heading angle variations, which are sensed by the gyroscope sensor, in a turning section while the vehicle is actually traveling.

According to another aspect of the present disclosure, a system of compensating for a gyro sensing value may include: a gyroscope sensor that senses a rotational angular velocity of a vehicle; a detailed map database that stores a detailed map including lane information; and an apparatus that compensates for the gyro sensing value by calculating a gyro bias and a gyro scale factor by using the detailed map and surrounding data of the vehicle, which is acquired inside the vehicle.

According to an aspect of the present disclosure, the apparatus may include a gyro bias compensator that eliminates the gyro bias from the gyro sensing value, which is received from the gyroscope sensor, through map matching between the detailed map and vehicle surrounding data which is actually acquired by the vehicle. The apparatus may also include a gyro scale factor compensator that calculates the gyro scale factor by calculating a heading angle variation of a road, on which a vehicle is traveling, by using the detailed map when the vehicle is turning, and compensates for the gyro sensing value by using the calculated gyro scale factor.

According to another aspect of the present disclosure, a method of compensating for a gyro sensing value may include: compensating for a gyro bias included in the gyro sensing value, which is received from a gyroscope sensor, through map matching between a detailed map and vehicle surrounding data acquired by a vehicle, while the vehicle is traveling straight ahead; calculating a gyro scale factor by calculating a heading angle variation of a road, on which a vehicle is traveling, by using the detailed map while the vehicle is turning; and compensating for the gyro sensing value by using the calculated gyro scale factor.

According to an embodiment, the compensating for the gyro bias may include: determining whether the vehicle is traveling straight ahead and entering into a map matching mode if the vehicle is traveling straight ahead; performing map matching between the detailed map and captured image data of surroundings of the vehicle or LIDAR sensing data in the entrance into the map matching mode; calculating a map matching gyro bias based on a result of the map matching; and compensating for the gyro sensing value by eliminating the map matching gyro bias from the gyro sensing value.

According to an embodiment, the calculating of the map matching gyro bias may include calculating the map matching gyro bias by subtracting a heading angle error value, which is obtained through the map matching, from a heading angle acquired by the gyroscope sensor through dead reckoning navigation.

According to an embodiment, the calculating of the map matching gyro bias further may include calculating a final map matching gyro bias by dividing the calculated map matching gyro bias by the number of times of performing the dead reckoning navigation.

According to an embodiment, the compensating for the gyro sensing value by using the calculated gyro scale factor may include: determining whether the vehicle is turning and entering into a gyro scale factor calculation mode if the vehicle is turning; calculating the gyro scale factor by using the heading angle variation of the road, on which the vehicle is traveling, on the detailed map, and an accumulation value of heading angle variations, which are sensed by the gyroscope sensor, in the entrance into the gyro scale factor calculation mode; and compensating for the gyro sensing value by using the calculated gyro scale factor.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
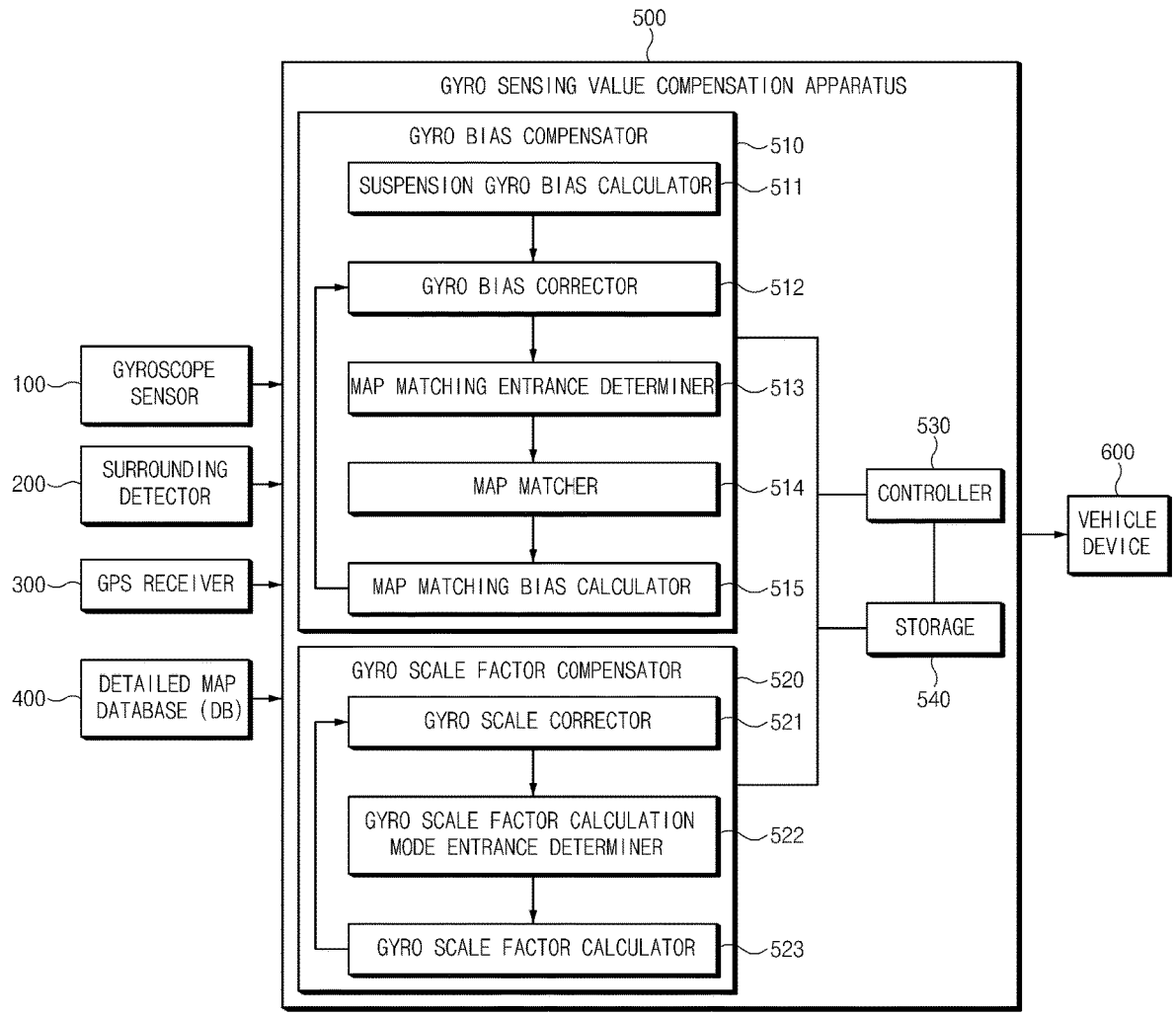
FIG. 1 is a block diagram illustrating a system for compensating for a sensing value of a gyroscope sensor, according to an embodiment of the present disclosure.

Hereinafter, embodiments of the present disclosure will be described in detail with reference to the accompanying drawings. In the drawings, the same reference numerals will be used throughout to designate the same or equivalent elements. In addition, in the following description, a detailed description of well-known features or functions will be ruled out in order not to unnecessarily obscure the gist of the present disclosure.

In the following description of elements according to an embodiment of the present disclosure, the terms 'first', 'second', 'A', 'B', '(a)', and '(b)' may be used. The terms are used only to distinguish relevant elements from other elements, and the nature, the order, or the sequence of the relevant elements is not limited to the terms. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 9.

Figure 2:
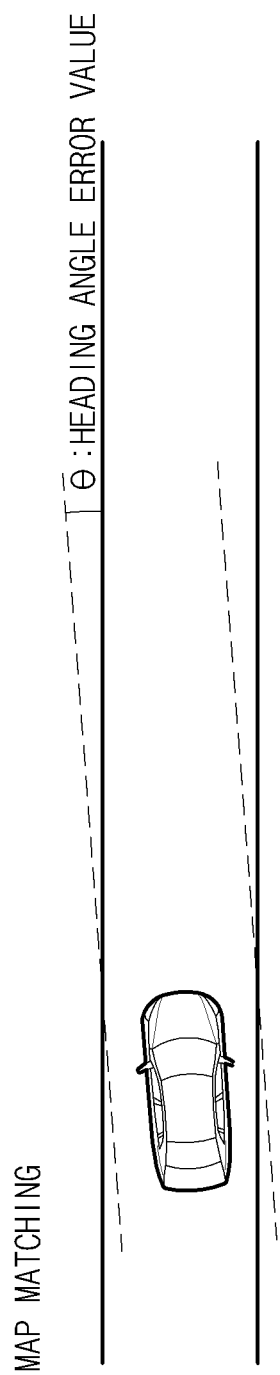
FIG. 2 is a view illustrating a map matching manner, according to an embodiment of the present disclosure.
Figure 3:
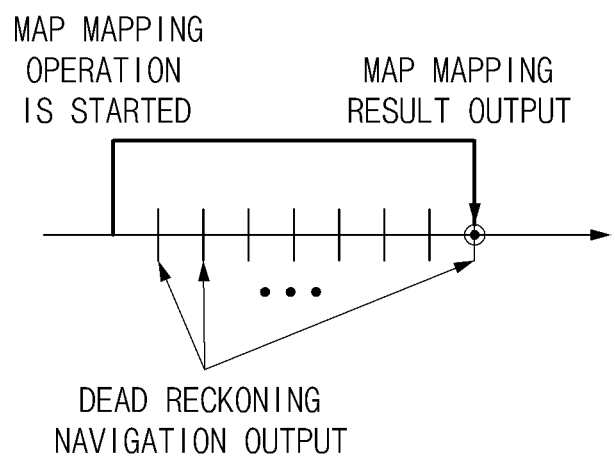
FIG. 3 is a view illustrating a dead reckoning navigation output manner, according to an embodiment of the present disclosure.
Figure 4:
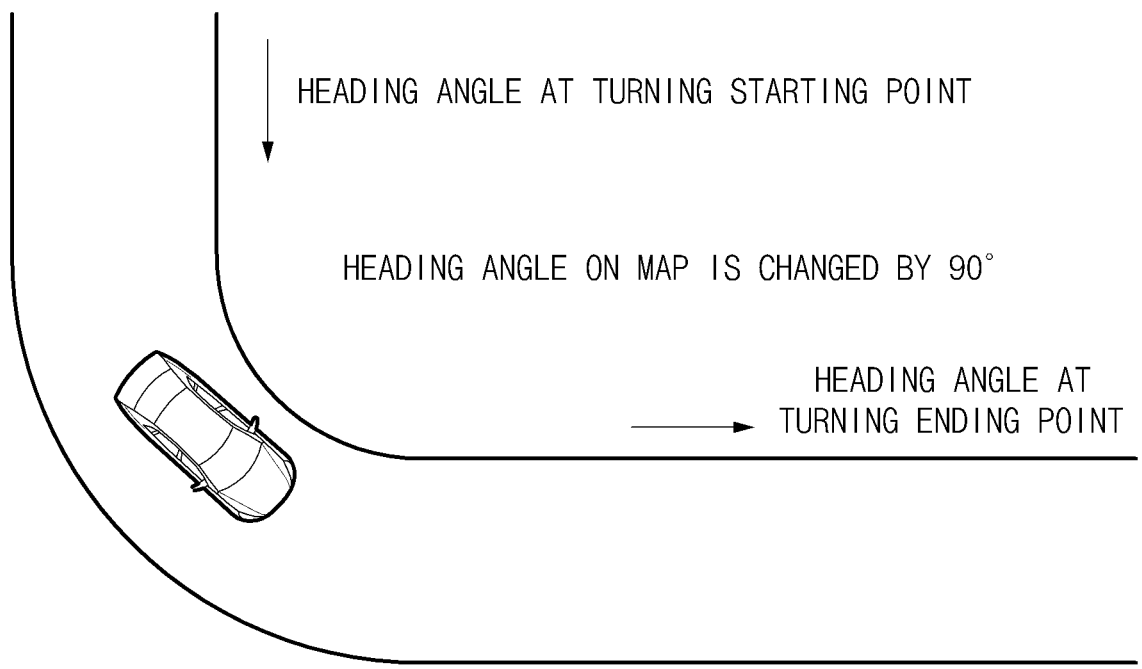
FIG. 4 is a view illustrating a gyro scale factor compensating manner, according to an embodiment of the present disclosure.

FIG. 1 is a block diagram illustrating a system for compensating for a sensing value (hereinafter, referred to as "gyro sensing value") of a gyroscope sensor, according to an embodiment of the present disclosure. FIG. 2 is a view illustrating a map matching manner, according to an embodiment of the present disclosure. FIG. 3 is a view illustrating a dead reckoning navigation output manner, according to an embodiment of the present disclosure. FIG. 4 is a view illustrating a gyro scale factor compensating manner, according to an embodiment.

Referring to FIG. 1, the system for compensating for the gyro sensing value according to an embodiment of the present disclosure may include a gyroscope sensor 100, a surrounding detector 200, a GPS receiver 300, a detailed map database (DB) 400, an apparatus (hereinafter, referred to as "gyro sensing value compensation apparatus") 500 for compensating for the gyro sensing value, and a vehicle device 600.

The gyroscope sensor 100 may sense a rotation angular velocity of a vehicle to transmit the rotation angular velocity of the vehicle to the gyro sensing value compensation apparatus 500 such that a controller 530 of the gyro sensing value compensation apparatus 500 sets the orientation of the vehicle when performing dead reckoning navigation.

The surrounding detector 200 includes a camera, which captures the surroundings of the vehicle, a light detection and ranging (LIDAR) sensor, and a radio detection and ranging (RADAR) sensor. The surrounding detector 200 acquires information, such as lane information or obstacle information, and transmits the information to the gyro sensing value compensation apparatus 500. In this case, the camera may include a front camera, a rear camera, and an around view monitoring system (AVM).

The GPS receiver 300 receives navigation information on a position, a speed, a forward direction, or the like from a GPS satellite and transmits the navigation information to the gyro sensing value compensation apparatus 500.

The detailed map DB 400 stores detailed maps including detailed information, such as lane information, a heading angle, curve information, speed limit information, and road boundary information, and is used when performing map matching in the gyro sensing value compensation apparatus 500.

The gyro sensing value compensation apparatus 500 calculates a gyro bias and a gyro scale factor by using the detailed map and vehicle surrounding data actually acquired inside the vehicle and compensates for the gyro sensing value.

$$\text{gyro sensing value} = \text{gyro scale factor} * g + \text{gyro bias} \quad (1)$$

As expressed in Equation 1, the gyro sensing value is obtained by multiplying a gyro sensing value (g) by the gyro scale factor, and by adding up the multiplication result and the gyro bias. Therefore, according to the present disclosure, the gyro sensing value is compensated by eliminating the gyro bias and compensating for the gyro scale factor.

To this end, the gyro sensing value compensation apparatus 500 may include a gyro bias compensator 510, a gyro scale factor compensator 520, the controller 530, and a storage 540.

The gyro bias compensator 510 eliminates the gyro bias from the gyro sensing value, which is received from the gyroscope sensor 100, through the map matching between the detailed map, which is stored in the detailed map DB 400, and vehicle surrounding data, which is actually acquired through the surrounding detector 200, when the vehicle travels straight ahead. In this case, the vehicle surrounding data may include image data captured by the camera and data sensed by the LIDAR sensor or the RADAR sensor.

To this end, the gyro bias compensator 510 includes a suspension gyro bias calculator 511, a gyro bias corrector 512, a map matching entrance determiner 513, a map matcher 514, and a map matching gyro bias calculator 515.

The suspension gyro bias calculator 511 calculates a suspension gyro bias when the vehicle is stopped.

The gyro bias corrector 512 determines whether the latest gyro bias, which is recently calculated and stored, is a map matching gyro bias calculated through the map matching. If the latest gyro bias, which is recently calculated and stored, is the map matching gyro bias calculated through the map matching, the gyro bias corrector 512 performs gyro bias correction by using the map matching gyro bias. If the latest gyro bias, which is recently calculated and stored, is not the map matching gyro bias calculated through the map matching, the gyro bias corrector 512 performs the gyro bias correction by using the suspension gyro bias calculated when the vehicle is stopped.

The gyro bias corrector 512 may perform the gyro bias correction by eliminating the map matching gyro bias from the gyro sensing value as expressed in following equation 2.

corrected gyro sensing value=gyro sensing value−gyro bias    (2)

The gyro bias corrector 512 may correct for a gyro sensing value by using a gyro bias, which is calculated in an existing manner when the vehicle is stopped. The gyro bias corrector 512 corrects for the gyro sensing value by using the map matching gyro bias when the vehicle is traveling straight ahead. In this case, because the technology of calculating and compensating for the gyro bias when the vehicle is stopped is well known to those skilled in the art, the details thereof will be omitted.

The map matching entrance determiner 513 determines whether the vehicle is traveling straight ahead. If the vehicle is traveling straight ahead, the map matching entrance determiner 513 allows the gyro sensing value compensation apparatus 500 to enter into a map matching mode.

In this case, the map matching entrance determiner 513 determines whether a forward runway is a straight road, the angle of a steering wheel is zero, and map matching accuracy is high. If the above all conditions are satisfied, the map matching entrance determiner 513 allows the gyro sensing value compensation apparatus 500 to enter into the map matching mode. In this case, the map matching accuracy may be estimated from a previous map matching history and may be stored. The entrance is made into the map matching mode if the above all conditions are satisfied. The above conditions are to determine whether the vehicle is traveling straight ahead. Accordingly, if all of the above conditions are satisfied, the vehicle is determined to be traveling straight ahead to allow the gyro sensing value compensation apparatus 500 to enter into the map mapping mode for calculating the gyro bias.

The map matcher 514 matches the detailed map to captured image data of the surroundings of the vehicle and data on the surroundings, which is sensed by the LIDAR sensor or the RADAR sensor, when the gyro sensing value compensation apparatus 500 enters into the map matching mode.

The map matching gyro bias calculator 515 calculates the map matching gyro bias based on the result of the map matching. Referring to FIG. 2, the map matching gyro bias calculator 515 may calculate the map matching gyro bias by subtracting a heading angle error value, which is obtained through the map matching, from a heading angle acquired by the gyroscope sensor 100 through dead reckoning navigation.

In this case, as illustrated in FIG. 3, the dead reckoning navigation is performed several times by utilizing the gyroscope sensor 100 during the map matching. For this reason, the calculated map matching gyro bias has to be divided by the number of times of performing the dead reckoning navigation when a final map matching gyro bias is calculated, because the map matching heading angle error value is an accumulation value of the gyro bias, which is obtained through dead reckoning navigation performed.

The map matching gyro bias calculator 515 may calculate the final map matching gyro bias by dividing the calculated map matching gyro bias by the number of times of performing the dead reckoning navigation, as expressed in following equation 3.

$$\text{Final map matching gyro bias} = \frac{\text{map matching gyro bias}}{\text{number of times of performing dead reckoning navigation}} \quad (3)$$

The gyro scale factor compensator 520 calculates the gyro scale factor by calculating a heading angle variation of a road, on which the vehicle is traveling, by using the detailed map when the vehicle is turning, and compensates for the gyro sensing value by using the calculated scale factor.

To this end, the gyro scale factor compensator 520 includes a gyro scale corrector 521, a gyro scale factor calculation mode entrance determiner 522, and a gyro scale factor calculator 523.

The gyro scale corrector 521 may correct for the gyro sensing value by using the calculated gyro scale factor. In other words, as expressed in Equation 4, a gyro sensing value is compensated by multiplying the calculated gyro sensing value by the calculated gyro scale factor.

compensated gyro sensing value=gyro sensing value*gyro scale factor    (4)

The gyro scale factor calculation mode entrance determiner 522 determines whether the vehicle is turning, to allow the gyro sensing value compensation apparatus 500 to enter into a gyro scale factor calculation mode if the vehicle is turning. The gyro scale factor calculation mode entrance determiner 522 determines whether the difference in the heading angle between starting and ending points of a forward curved road is below a first reference value, whether the difference between the variation in a steering wheel angle and a rotation angle value of the gyro sensing value is below a second reference value, whether the radius of the forward curved road is below a third reference value, and whether the lateral acceleration of the vehicle is below a fourth reference value. If all of the above conditions are satisfied, the gyro scale factor calculation mode entrance determiner 522 allows the gyro sensing value compensation apparatus 500 to enter into the gyro scale factor entrance calculation mode. In this case, all of the conditions are to determine whether the vehicle is turning. If all of the conditions are satisfied, the vehicle is determined to be turning and the gyro sensing value compensation apparatus 500 enters into the gyro scale factor calculation mode.

The gyro scale factor calculator 523 may calculate the gyro scale factor by using a heading angle variation of the road, on which the vehicle is traveling, on the detailed map, and the accumulation value of the heading angle variations, which are sensed by the gyroscope sensor 100, in the entrance into the gyro scale factor calculation mode.

Referring to FIG. 4, the gyro scale factor calculator 523 may calculate the gyro scale factor by dividing a result value, which is obtained by subtracting a heading angle at a turning starting point from a heading angle at a turning ending point of the road, on which the vehicle is traveling, on the detailed map, by the accumulation value of heading angle variations, which are sensed by the gyroscope sensor 100, in a turning section while the vehicle is actually traveling, as expressed in Equation 5.

$$\text{gyro scale factor} = \tag{5}$$

$$\frac{\text{heading angle at turning ending point on detailed map} - \text{heading angle at turning point on detailed map}}{\text{accumulation value of heading angle variations sensed through gyro sensing in turning section}}$$

The controller 530 may perform Satellite Base Navigation by using navigation information acquired from the GPS receiver 300 and perform Dead Reckoning Navigation by using the gyro sensing value acquired from the gyroscope sensor 100 when the vehicle travels in a receive shadow area of a GPS signal, thereby recognizing a self-location of the vehicle.

The storage 540 stores the suspension gyro bias, the map matching gyro bias, the gyro scale factor, and information received from the gyroscope sensor 100, the surrounding detector 200, and the GPS receiver 300.

The vehicle device 600 performs localization by using the gyro sensing value compensated by the gyro sensing value compensation apparatus 500 and provides services, such as vehicle driving support, autonomous driving, and vehicle guidance, based on the localization. Accordingly, the vehicle device 600 may include all vehicle devices, such as a vehicle driving support device, an advanced driver assistance system (ADAS), a lane keeping assist system (LKAS), and a lane follow assist (LFA), requiring the localization result.

Although the present disclosure discloses the vehicle device 600 provided separately from the gyro sensing value compensation apparatus 500, the vehicle device 600 and the gyro sensing value compensation apparatus 500 may be realized in the form of one module by providing a function of compensating for a gyro sensing value to the inner part of the vehicle device 600.

Figure 5:
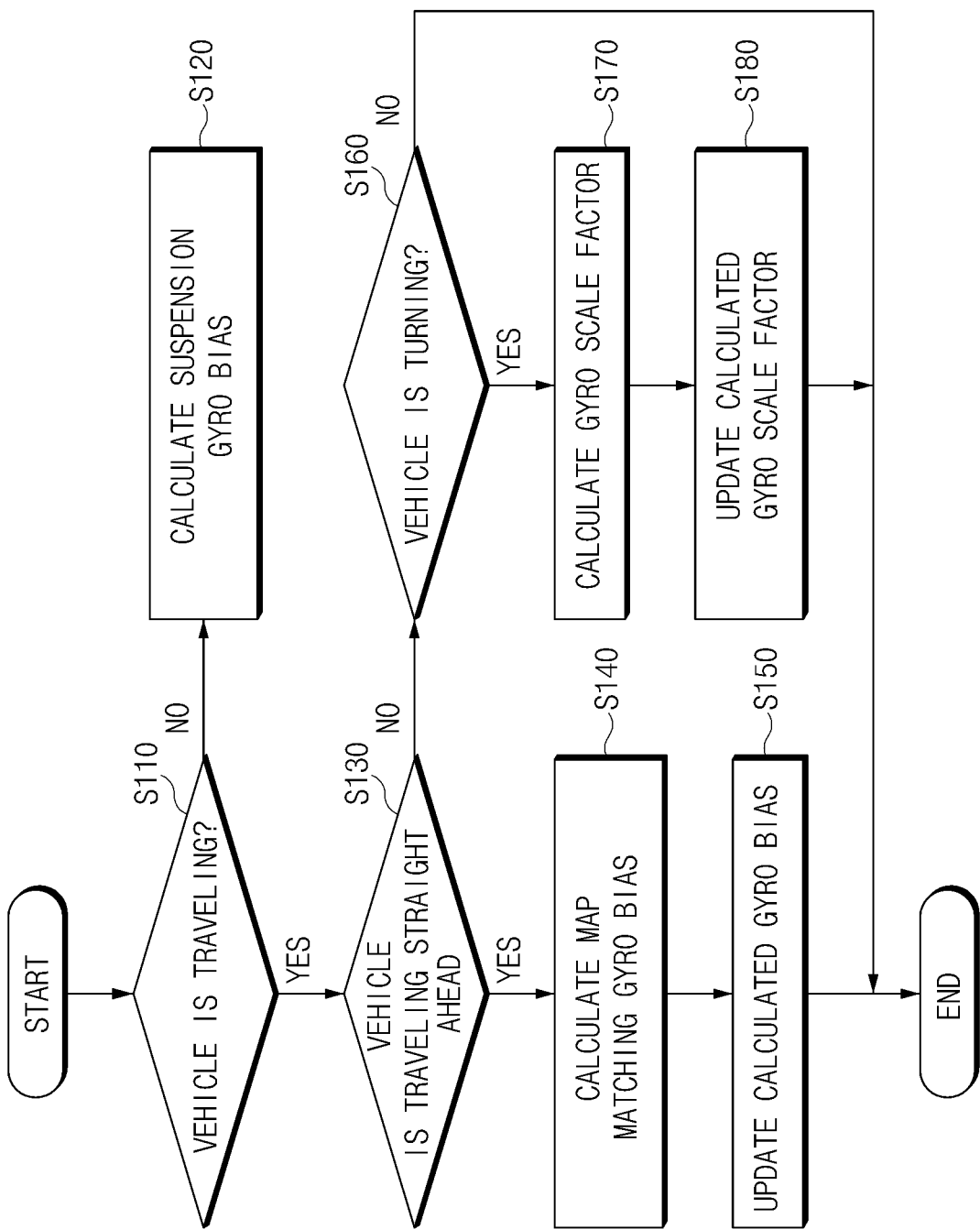
FIG. 5 is a flowchart illustrating a method of compensating for a sensing value of a gyroscope sensor, according to an embodiment of the present disclosure.

Hereinafter, the method of compensating for the gyro sensing value according to an embodiment of the present disclosure will be described with reference to FIG. 5. FIG. 5 is a flowchart illustrating the method of compensating for the gyro sensing value, according to an embodiment of the present disclosure.

Referring to FIG. 5, the gyro sensing value compensation apparatus 500 determines whether a vehicle is traveling (S110). If the vehicle is not traveling, (that is, the vehicle is stopped), the gyro sensing value compensation apparatus 500 calculates a suspension gyro bias (S120).

Meanwhile, if the vehicle is traveling, the gyro sensing value compensation apparatus 500 determines whether the vehicle is traveling straight ahead (S130). If the vehicle is traveling straight ahead, the gyro sensing value compensation apparatus 500 performs map matching between the detailed map and surrounding data sensed by the surrounding detector 200 to calculate the map matching gyro bias (S140). Then, the gyro sensing value compensation apparatus 500 updates the calculated map matching gyro bias (S150)

Meanwhile, if the vehicle is not traveling straight ahead, the gyro sensing value compensation apparatus 500 determines whether the vehicle is turning (S160). If the vehicle is turning, the gyro sensing value compensation apparatus 500 calculates the gyro scale factor (S170) and updates a present gyro scale factor to the calculated gyro scale factor (S180).

Figure 6:
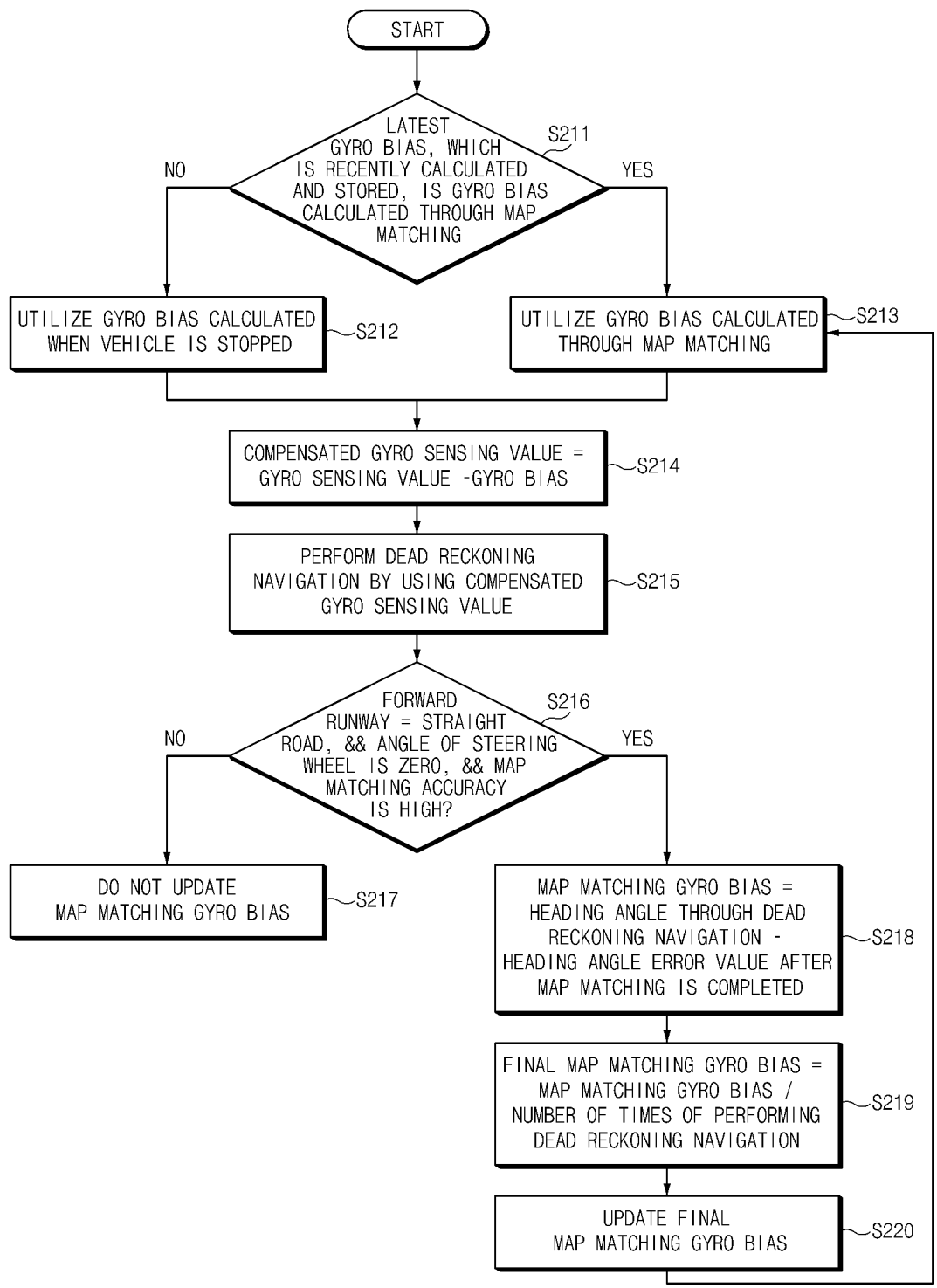
FIG. 6 is a flowchart illustrating a method of compensating for a sensing value of a gyroscope scope by using a gyro bias, according to an embodiment of the present disclosure.
Figure 8A:
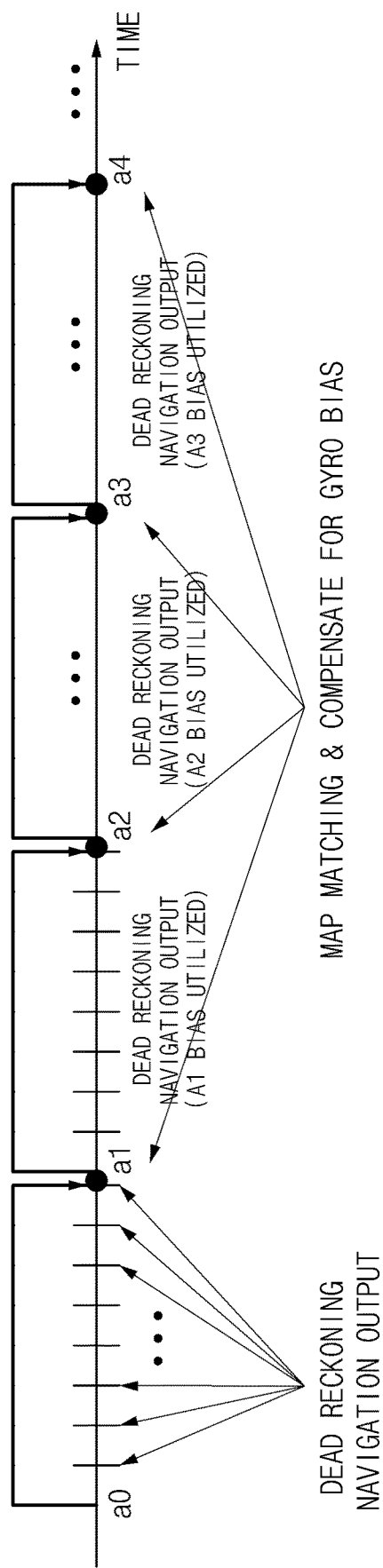
FIG. 8A is a view illustrating a case that a gyro bias is able to be compensated through periodic map matching during traveling according to an embodiment of the present disclosure.
Figure 8B:
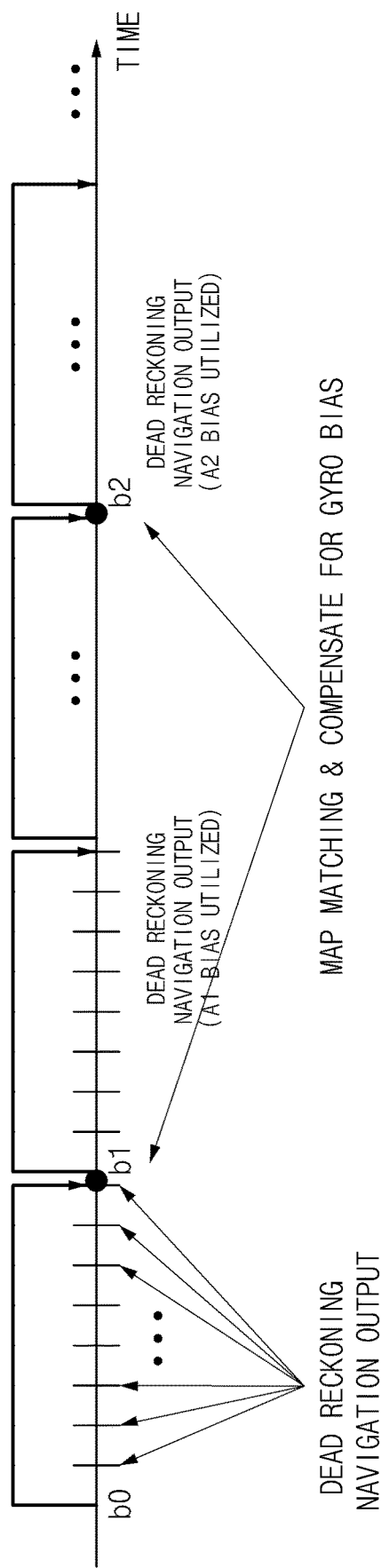
FIG. 8B is a view illustrating a case that a gyro bias is able to be compensated through intermittent map matching during traveling, according to an embodiment of the present disclosure.
Figure 8C:
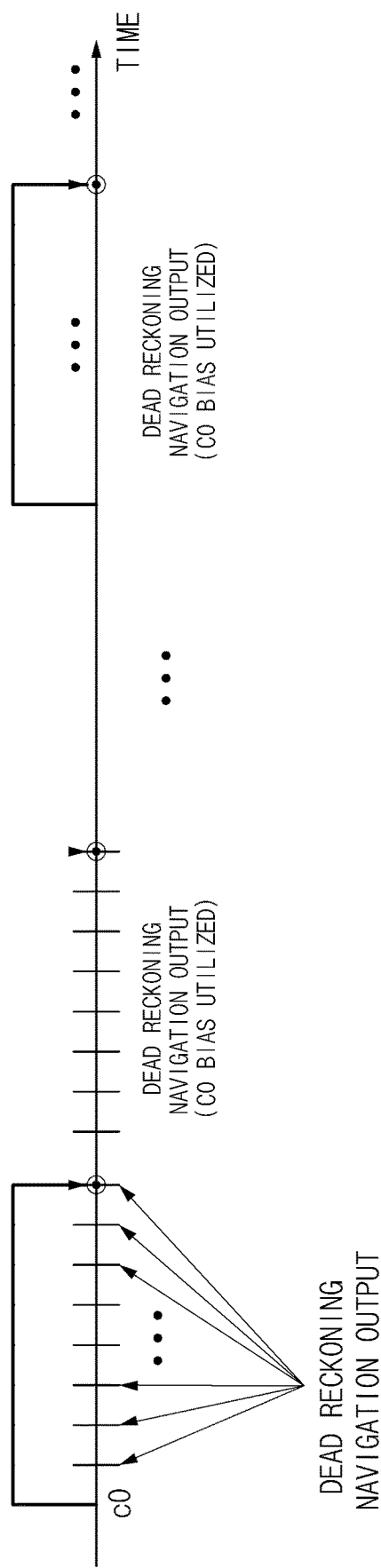
FIG. 8C is a view illustrating a case that map matching is difficult during traveling, according to an embodiment of the present disclosure.

Hereinafter, the method of compensating for the gyro sensing value using the gyro bias will be described in detail with reference to FIG. 6, according to an embodiment of the present disclosure. FIG. 6 is a flowchart illustrating a method of compensating for a gyro sensing value, according to an embodiment of the present disclosure. FIG. 8A is a view illustrating a case that a gyro bias is able to be compensated through periodic map matching during traveling, according to an embodiment of the present disclosure. FIG. 8B is a view illustrating a case that a gyro bias is able to be compensated through intermittent map matching during traveling, according to an embodiment of the present disclosure. FIG. 8C is a view illustrating a case that map matching is difficult during traveling, according to an embodiment of the present disclosure.

Referring to FIG. 6, the gyro sensing value compensation apparatus 500 determines whether the latest gyro bias, which is recently calculated and stored, is a map matching gyro bias calculated through the map matching (S211). If the map matching gyro bias is calculated through recent map matching, the gyro sensing value is compensated (S214) by utilizing the map matching gyro bias (S213). In other words, the gyro sensing value compensation apparatus 500 compensates for the gyro sensing value by subtracting the map matching gyro bias from the gyro sensing value.

Meanwhile, if the map matching gyro bias is not calculated through the recent map matching, the gyro sensing value compensation apparatus 500 may compensate for the gyro sensing value (S214) by utilizing a suspension gyro bias calculated when the vehicle is stopped (S212).

Accordingly, the gyro sensing value compensation apparatus 500 may perform Dead Reckoning Navigation by using the compensated gyro sensing value (S215).

Thereafter, the gyro sensing value compensation apparatus 500 determines whether the condition of entering into the map matching mode is satisfied to calculate the map matching gyro bias while the vehicle is traveling.

In this case, it is determined whether a forward runway is a straight road, the angle of a steering wheel is zero, and map matching accuracy is high. If all of the conditions are satisfied, the entrance into the map matching mode is made. In this case, the map matching accuracy may be estimated from a previous map matching history and may be stored. The entrance into the map matching mode is made if the above all conditions are satisfied. The above conditions are to determine whether the vehicle is traveling straight ahead. Accordingly, if all conditions are satisfied, the vehicle is determined to be traveling straight ahead such that the gyro sensing value compensation apparatus 500 enters into the map mapping mode to calculate the gyro bias.

If the above conditions are not satisfied, the gyro sensing value compensation apparatus 500 does not update the map matching gyro bias (S217). If all of the above conditions are satisfied, because the vehicle is traveling straight ahead, the entrance into the map matching mode is made and the map matching is performed, thereby calculating the map matching gyro bias (S218).

The final map matching gyro bias, which is calculated by dividing the calculated map matching gyro bias by the number of times of performing the dead reckoning navigation (S219), is updated as the map matching gyro bias (S220). Accordingly, thereafter, when the gyro sensing value is compensated, the updated map matching gyro bias may be used.

As described above, the dead reckoning navigation is periodically performed for a short period of time while the vehicle is traveling. If the compensation for the gyro sensing value is possible through the map matching, the dead reckoning navigation is performed by the compensated gyro sensing value, thereby improving performance.

FIG. 8A illustrates the case that the compensation for the gyro bias is possible through periodic map matching while the vehicle is traveling (e.g., the situation that the vehicle is traveling on a highway). It is recognized from FIG. 8A that eight dead reckoning navigation outputs are made for one map matching duration.

FIG. 8B illustrates the case that the compensation for the gyro bias is possible through intermittent map matching while the vehicle is traveling (e.g., the road surface is in an inferior lane state). Although gyro biases are calculated by performing two map matchings b0 and b1, a gyro bias fails to be calculated through the map matching thereafter. Accordingly, the compensation for the gyro bias is performed by the latest map matching gyro bias b1.

Referring to FIG. 8C, in the case that the map matching is difficult or the condition for the entrance into the map matching mode is not satisfied while the vehicle is traveling (e.g., the case that the detailed map is absent), the compensation for the gyro bias is performed by using a gyro bias CO calculated through a conventional manner when the vehicle is stopped.

Figure 7:
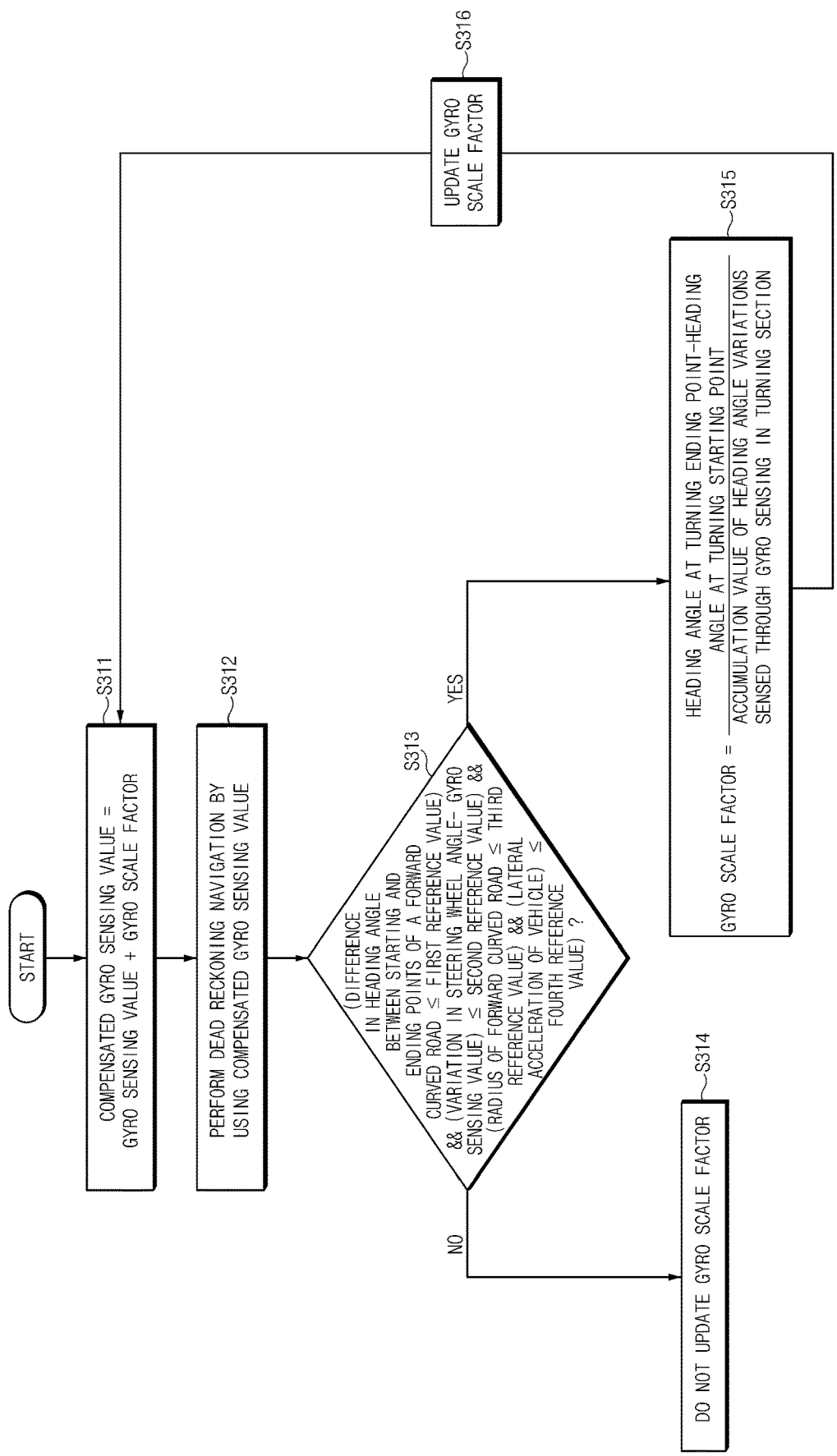
FIG. 7 is a flowchart illustrating a method of compensating for a sensing value of a gyroscope scope by using a gyro bias, according to an embodiment of the present disclosure.

Hereinafter, the method of compensating for the gyro sensing value using the gyro scale factor will be described in detail with reference to FIG. 7, according to an embodiment of the present disclosure. FIG. 7 is a flowchart illustrating the method of compensating for the gyro sensing value by using the gyro scale factor, according to an embodiment of the present disclosure.

Referring to FIG. 7, the gyro sensing value compensation apparatus 500 compensates for a gyro sensing value by multiplying the gyro sensing value by the gyro scale factor (S311). Thereafter, the Dead Reckoning Navigation is performed by using the compensated gyro sensing value (S312).

Thereafter, the gyro sensing value compensation apparatus 500 determines whether the vehicle is turning, to enter into a gyro scale factor calculation mode (S313). In other words, the gyro sensing value compensation apparatus 500 determines whether the difference in heading angle between starting and ending points of a forward curved road is below a first reference value, whether the difference between the variation in a steering wheel angle and a rotation angle value of the gyro sensing value is below a second reference value, whether the radius of the forward curved road is below a third reference value, and the lateral acceleration of the vehicle is below a fourth reference value. If all of the above conditions are satisfied, the gyro sensing value compensation apparatus 500 enters into the gyro scale factor calculation mode. In this case, all of the conditions are to determine whether the vehicle is turning. When all of the conditions are satisfied, the vehicle is determined to be turning, such that the gyro sensing value compensation apparatus 500 enters into the gyro scale factor calculation mode.

If the above conditions are not satisfied, the gyro sensing value compensation apparatus 500 does not update the gyro scale factor (S314). If the above conditions are satisfied, the gyro sensing value compensation apparatus 500 may calculate the gyro scale factor by dividing a result value, which is obtained by subtracting a heading angle at a turning starting point from a heading angle at a turning ending point of the traveling road on the detailed map, by the accumulation value of the heading angle variations, which are sensed by the gyroscope sensor 100, in a turning section while the vehicle is actually traveling (S315).

Thereafter, the gyro sensing value compensation apparatus 500 updates a present gyro scale factor to the calculated gyro scale factor (S316).

As described above, according to the present disclosure, the gyro bias, which is the drift error of the gyroscope sensor 100, is calculated through the map matching between the detailed map and the data acquired by the surrounding detector 200, thereby eliminating the gyro bias from the gyro sensing value. In addition, the gyro scale factor is calculated by using the heading angle variation of the detailed map and the accumulation value of the heading angle variation measured by the gyroscope sensor 100, thereby improving the localization performance. Accordingly, the performance of vehicle devices employing the localization performance may be improved.

In addition, according to the present disclosure, the accuracy in the gyroscope sensor result is increased by compensating the gyroscope sensor 100. Accordingly, the performance of the Dead Reckoning Navigation may be improved, and the lateral control of the vehicle is possible even in the case of curvature which is rapidly represented.

Figure 9:
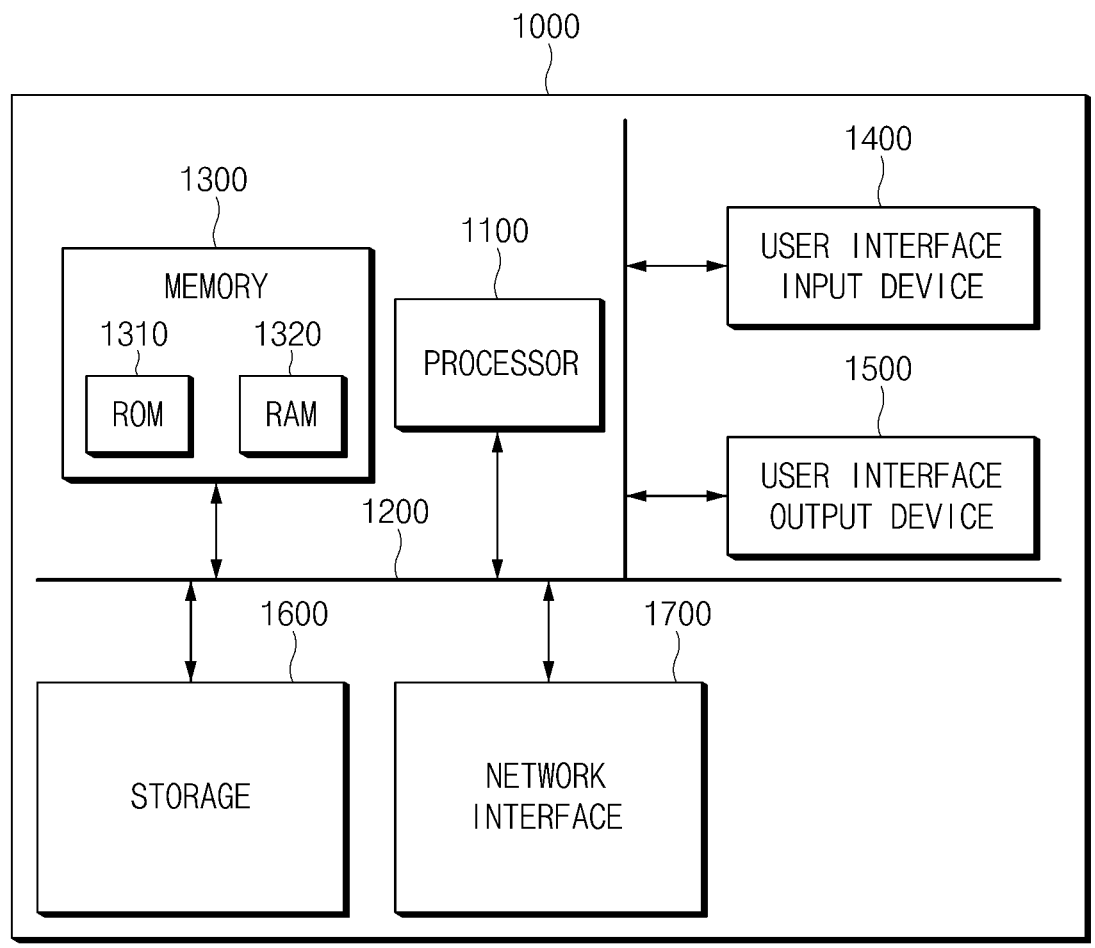
FIG. 9 is a block diagram to which the method of compensating for the sensing value of the gyroscope sensor is applied, according to an embodiment of the present disclosure.

FIG. 9 is a block diagram of a computer system to which the method of compensating for the gyro sensing value is applied, according to an embodiment of the present disclosure.

Referring to FIG. 9, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the present disclosure may be directly implemented with a hardware module, a software module, or combinations thereof, executed by the processor 1100. The software module may reside on a storage medium (e.g., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to the present disclosure, the localization performance may be improved by eliminating the bias, which serves as the drift error of the gyroscope sensor, using a detailed map and sensed data on surroundings of the vehicle, and calculating a scale factor to compensate for the gyro sensing value.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

What is claimed is:

1. An apparatus of compensating for a gyro sensing value, the apparatus comprising:
   a processor; and
   a non-transitory storage medium containing program instructions that, when executed by the processor, causes the apparatus to
   eliminate a gyro bias from the gyro sensing value, which is received from a gyroscope sensor, through map matching between a detailed map and acquired vehicle surrounding data, and
   calculate a gyro scale factor by calculating a heading angle variation of a road on which a vehicle is traveling by using the detailed map when the vehicle is turning, and to compensate for the gyro sensing value by using the calculated gyro scale factor,
   wherein the processor causes the apparatus to calculate the gyro scale factor when the vehicle is turning, and
   wherein the processor further causes the apparatus to
   determine whether the vehicle is turning and to allow the apparatus to enter into a scale factor calculation mode when the vehicle is turning, and
   calculate the gyro scale factor by using the heading angle variation of the road, on which the vehicle is traveling, on the detailed map, and by using an accumulation value of heading angle variations, which are sensed by the gyroscope sensor, when the apparatus enters into the scale factor calculation mode.

2. The apparatus of claim 1, wherein the processor further causes the apparatus to perform the map matching when the vehicle is traveling straight ahead.

3. The apparatus of claim 2, wherein the processor further causes the apparatus to:
   determine whether the vehicle is traveling straight ahead and to allow the apparatus to enter into a map matching mode when the vehicle is traveling straight ahead;
   perform the map matching between the detailed map and captured image data of surroundings of the vehicle or LIDAR sensing data when the apparatus enters into the map matching mode;
   calculate a map matching gyro bias based on a result of the map matching; and
   correct for the gyro sensing value by eliminating the map matching gyro bias from the gyro sensing value.

4. The apparatus of claim 3, wherein the processor further causes the apparatus to determine whether a forward runway is a straight road, an angle of a steering wheel is zero, and map matching accuracy is higher than a predetermined reference value, and to enter the map matching mode when the forward runway is the straight road, the angle of the steering wheel is zero, and the map matching accuracy is high.

5. The apparatus of claim 3, wherein the processor further causes the apparatus to calculate a suspension gyro bias when the vehicle is stopped.

6. The apparatus of claim 5, wherein the processor further causes the apparatus to correct for the gyro sensing value by using the suspension gyro bias when the vehicle is stopped.

7. The apparatus of claim 3, wherein the processor further causes the apparatus to calculate the map matching gyro bias by subtracting a heading angle error value, which is obtained through the map matching, from a heading angle acquired by the gyroscope sensor through dead reckoning navigation.

8. The apparatus of claim 7, wherein the processor further causes the apparatus to calculate a final map matching gyro bias by dividing the calculated map matching gyro bias by a number of times of performing the dead reckoning navigation.

9. The apparatus of claim 1, wherein the processor further causes the apparatus to:
   determine whether a difference in heading angle between starting and ending points of a forward curved road is below a first reference value, whether a difference between a variation in a steering wheel angle and a rotation angle value of the gyro sensing value is below a second reference value, whether a radius of the forward curved road is below a third reference value, and whether a lateral acceleration of the vehicle is below a fourth reference value; and
   enter into the scale factor calculation mode when the difference in the heading angle between the starting and ending points of the forward curved road is below the first reference value, when the difference between the variation in the steering wheel angle and the rotation angle value of the gyro sensing value is below the second reference value, when the radius of the forward curved road is below the third reference value, and when the lateral acceleration of the vehicle is below the fourth reference value.

10. The apparatus of claim 1, wherein the processor further causes the apparatus to calculate the gyro scale factor by dividing a result value, which is obtained by subtracting a heading angle at a turning starting point from a heading angle at a turning ending point of the road, on which the vehicle is traveling, on the detailed map, by an accumulation value of heading angle variations, which are sensed by the gyroscope sensor, in a turning section while the vehicle is traveling.

11. A system of compensating for a gyro sensing value, the system comprising:
   a gyroscope sensor configured to sense a rotational angular velocity of a vehicle;
   a detailed map database configured to store a detailed map including lane information; and
   an apparatus configured to compensate for the gyro sensing value by calculating a gyro bias and a gyro scale factor by using the detailed map and surrounding data of the vehicle, wherein the surrounding data is acquired inside the vehicle, wherein the apparatus calculates the gyro scale factor when the vehicle is turning, and
   wherein the apparatus is further configured to
   determine whether the vehicle is turning and to allow the apparatus to enter into a scale factor calculation mode when the vehicle is turning, and
   calculate the gyro scale factor by using the heading angle variation of the road, on which the vehicle is traveling, on the detailed map, and by using an accumulation value of heading angle variations, which are sensed by the gyroscope sensor, when the apparatus enters into the scale factor calculation mode.

12. The system of claim 11, wherein the apparatus includes:
   a processor; and
   a non-transitory storage medium containing program instructions that, when executed by the processor causes the apparatus to:
   eliminate the gyro bias from the gyro sensing value, which is received from the gyroscope sensor, through map matching between the detailed map and the vehicle surrounding data; and
   calculate the gyro scale factor by calculating a heading angle variation of a road, on which a vehicle is traveling, by using the detailed map when the vehicle is turning, and to compensate for the gyro sensing value by using the calculated gyro scale factor.

13. The system of claim 12, wherein the processor further causes the apparatus to:
   determine whether the vehicle is traveling straight ahead and to allow the apparatus to enter into a map matching mode when the vehicle is traveling straight ahead;
   perform the map matching between the detailed map and captured image data of surroundings of the vehicle or LIDAR sensing data when the apparatus enters into the map matching mode;
   calculate a map matching gyro bias based on a result of the map matching; and
   correct for the gyro sensing value by eliminating the map matching gyro bias from the gyro sensing value.

14. A method of compensating for a gyro sensing value, the method comprising:
   compensating for a gyro bias included in the gyro sensing value, which is received from a gyroscope sensor, through map matching between a detailed map and vehicle surrounding data acquired by a vehicle, while the vehicle is traveling straight ahead; and
   calculating a gyro scale factor by calculating a heading angle variation of a road, on which a vehicle is traveling, by using the detailed map while the vehicle is turning, and compensating for the gyro sensing value by using the calculated gyro scale factor,
   wherein the calculating a gyro scale factor includes calculating the gyro scale factor when the vehicle is turning, and
   wherein the compensating for the gyro sensing value by using the calculated gyro scale factor includes
      determining whether the vehicle is turning and entering into a gyro scale factor calculation mode when the vehicle is turning, and
      calculating the gyro scale factor by using the heading angle variation of the road, on which the vehicle is traveling, on the detailed map, and by using an accumulation value of heading angle variations, which are sensed by the gyroscope sensor, in the entrance into the gyro scale factor calculation mode.

15. The method of claim 14, wherein the compensating for the gyro bias includes:
   determining whether the vehicle is traveling straight ahead and entering into a map matching mode when the vehicle is traveling straight ahead;
   performing map matching between the detailed map and the captured image data of surroundings of the vehicle or LIDAR sensing data in the entrance into the map matching mode;
   calculating a map matching gyro bias based on a result of the map matching; and
   compensating for the gyro sensing value by eliminating the map matching gyro bias from the gyro sensing value.

16. The method of claim 15, wherein the calculating of the map matching gyro bias includes:
   calculating the map matching gyro bias by subtracting a heading angle error value, which is obtained through the map matching, from a heading angle acquired by the gyroscope sensor through dead reckoning navigation.

17. The method of claim 16, wherein the calculating of the map matching gyro bias further includes:
   calculating a final map matching gyro bias by dividing the calculated map matching gyro bias by a number of times of performing the dead reckoning navigation.

* * * * *